US008527800B2

(12) United States Patent
Zatylny et al.

(10) Patent No.: US 8,527,800 B2
(45) Date of Patent: Sep. 3, 2013

(54) METHOD AND APPARATUS FOR DISPLAYING HOUR BY HOUR POWER LEVEL STATUS TRANSITIONS FOR A NETWORK DEVICE BY PARSING CRON JOB STRINGS ASSOCIATED WITH THE NETWORK DEVICE

(75) Inventors: Karlo Martin Zatylny, Round Rock, TX (US); Annie Jarvis Ficklin, Austin, TX (US); Denny Charles Lecompte, Austin, TX (US); Derek James Webber, Austin, TX (US)

(73) Assignee: Solarwinds Worldwide, LLC, Austin, TX (US)

( * ) Notice: Subject to any disclaimer, the term of this patent is extended or adjusted under 35 U.S.C. 154(b) by 434 days.

(21) Appl. No.: 12/715,849

(22) Filed: Mar. 2, 2010

(65) Prior Publication Data
US 2011/0219254 A1 Sep. 8, 2011

(51) Int. Cl.
*G06F 11/30* (2006.01)
*G06F 15/177* (2006.01)

(52) U.S. Cl.
USPC .............................................. 713/340; 713/1

(58) Field of Classification Search
USPC ..................................... 713/1, 340; 715/227
See application file for complete search history.

(56) References Cited

U.S. PATENT DOCUMENTS

| 5,991,806 | A  | * | 11/1999 | McHann, Jr. | 709/224 |
|-----------|----|---|---------|-------------|---------|
| 6,032,172 | A  | * | 2/2000  | Kutcher | 718/102 |
| 6,408,395 | B1 | * | 6/2002  | Sugahara et al. | 713/310 |
| 6,718,213 | B1 | * | 4/2004  | Enberg | 700/22 |
| 6,985,901 | B1 | * | 1/2006  | Sachse et al. | 1/1 |
| 2007/0043855 | A1 | * | 2/2007 | Glicklich et al. | 709/224 |
| 2008/0184248 | A1 | * | 7/2008 | Barua et al. | 718/104 |
| 2009/0055520 | A1 | * | 2/2009 | Tabata et al. | 709/223 |

OTHER PUBLICATIONS

"Cron." Webopedia. N.p., n.d. Web. Jan. 16, 2013.*

* cited by examiner

*Primary Examiner* — Thomas Lee
*Assistant Examiner* — Terrell Johnson
(74) *Attorney, Agent, or Firm* — Squire Sanders (US) LLP

(57) ABSTRACT

Embodiments of the present invention include a method, apparatus, system, and/or computer program for monitoring energy consumption in a network and producing a display grid that provides a visual depiction of network device power consumption at any given time. The method includes, in one example, receiving a request for a power level schedule for a network device. The request may include a time period or date range over which the power level schedule should be produced. The method may also include retrieving Cron job strings associated with the network device, and parsing the Cron job strings to determine transitions from one power level to another and times for the transitions of the power level of the network device. The method further includes building a visual grid that depicts the power level schedule for the network device during each hour of the time period, based on the determined transitions.

16 Claims, 4 Drawing Sheets

```
interface FastEthernet1/0/2
 switchport mode access
 energywise level 10 recurrence importance 100 at 0 8 * * 1-5
 energywise level 4 recurrence importance 100 at 0 20 * * 1-5
 energywise level 1 recurrence importance 100 at 0 0 * * 6
 energywise level 0 recurrence importance 100 at 0 0 * * 0
 energywise level 4 recurrence importance 100 at 0 0 * * 1
```

Fig. 2

EnergyWise Policy Overview Calendar                                              EDIT  HELP Select Week: 10/4/2009-10/10/2009

| | Sun 10/4/2009 | Mon 10/5/2009 | Tue 10/6/2009 | Wed 10/7/2009 | Thu 10/8/2009 | Fri 10/9/2009 | Sat 10/10/2009 |
|---|---|---|---|---|---|---|---|
| 1 am | 0 | 4 | 4 | 4 | 4 | 4 | 1 |
| 2 am | 0 | 4 | 4 | 4 | 4 | 4 | 1 |
| 3 am | 0 | 4 | 4 | 4 | 4 | 4 | 1 |
| 4 am | 0 | 4 | 4 | 4 | 4 | 4 | 1 |
| 5 am | 0 | 4 | 4 | 4 | 4 | 4 | 1 |
| 6 am | 0 | 4 | 4 | 4 | 4 | 4 | 1 |
| 7 am | 0 | 4 | 4 | 4 | 4 | 4 | 1 |
| 8 am | 0 | 4 | 4 | 4 | 4 | 4 | 1 |
| 9 am | 0 | 10 | 10 | 10 | 10 | 10 | 1 |
| 10 am | 0 | 10 | 10 | 10 | 10 | 10 | 1 |
| 11 am | 0 | 10 | 10 | 10 | 10 | 10 | 1 |
| noon | 0 | 10 | 10 | 10 | 10 | 10 | 1 |
| 1 pm | 0 | 10 | 10 | 10 | 10 | 10 | 1 |
| 2 pm | 0 | 10 | 10 | 10 | 10 | 10 | 1 |
| 3 pm | 0 | 10 | 10 | 10 | 10 | 10 | 1 |
| 4 pm | 0 | 10 | 10 | 10 | 10 | 10 | 1 |
| 5 pm | 0 | 10 | 10 | 10 | 10 | 10 | 1 |
| 6 pm | 0 | 10 | 10 | 10 | 10 | 10 | 1 |
| 7 pm | 0 | 10 | 10 | 10 | 10 | 10 | 1 |
| 8 pm | 0 | 10 | 10 | 10 | 10 | 10 | 1 |
| 9 pm | 0 | 4 | 4 | 4 | 4 | 4 | 1 |
| 10 pm | 0 | 4 | 4 | 4 | 4 | 4 | 1 |
| 11 pm | 0 | 4 | 4 | 4 | 4 | 4 | 1 |
| midnight | 0 | 4 | 4 | 4 | 4 | 4 | 1 |

Legend for EnergyWise Power Levels
- 0 Shut
- 1 Hibernate
- 2 Sleep
- 3 Standby
- 4 Ready
- 5 Low
- 6 Frugal
- 7 Medium
- 8 Reduced
- 9 High
- 10 Full

* Time according to device.

Fig. 3

METHOD AND APPARATUS FOR DISPLAYING HOUR BY HOUR POWER LEVEL STATUS TRANSITIONS FOR A NETWORK DEVICE BY PARSING CRON JOB STRINGS ASSOCIATED WITH THE NETWORK DEVICE

BACKGROUND

1. Field

Embodiments of the invention generally relate to network power level consumption. More specifically, examples of the invention are directed to methods, systems, and/or computer programs for monitoring or controlling energy consumption of network devices.

2. Description of the Related Art

Network power usage data is of interest to network administrators for a number of reasons, including, for example, reducing costs, optimizing energy usage of network devices, and mitigating environmental impact. As networks become larger and comprise more network devices, monitoring and managing the power consumption of those network devices will become even more important. Because power consumption can raise costs significantly, businesses require ways to better monitor, manage, and control the energy consumption of their network devices.

There are a number of tools available for monitoring network performance and consumption. One such tool is Cisco Systems® EnergyWise, which focuses on reducing the energy consumption of all devices connected to a network. The devices may range from power over Ethernet (PoE) devices, such as IP phones and wireless access points, to IP-enabled building and lighting controllers. EnergyWise includes a framework for discovering, monitoring, optimizing, advising, and regulating energy needs for a business. EnergyWise provides a network-based approach for communicating messages that control energy between network devices and endpoints. As networks become more complex, businesses will have the need for systems that more efficiently monitor and depict network power consumption.

SUMMARY

One embodiment of the invention is directed to a method. The method includes receiving a request for a power level schedule for a network device. The request may include a time period over which the power level schedule is requested. The method further includes retrieving cron job strings associated with the network device, parsing the cron job strings to determine transitions from one power level to another and times for the transitions of the power level of the network device, and building a visual grid depicting the power level schedule for the network device during said time period based on the determined transitions.

Another embodiment is directed to an apparatus. The apparatus includes a receiver configured to receive a request for a power level schedule for a network device. The request may include a time period for the power level schedule. The apparatus also includes a processor configured to control the apparatus to retrieve cron job strings associated with the network device, to parse the cron job strings to determine transitions from one power level to another and times for the transitions of the power level of the network device, and to build a visual grid depicting the power level schedule for the network device during said time period based on the determined transitions.

Another embodiment is directed to a computer program embodied on a computer readable medium. The computer program is configured to control a processor to perform operations including receiving a request for a power level schedule for a network device. The request may include a time period over which the power level schedule is requested. The operations may further include retrieving cron job strings associated with the network device, parsing the cron job strings to determine transitions from one power level to another and times for the transitions of the power level of the network device, and building a visual grid depicting the power level schedule for the network device during said time period based on the determined transitions.

Another embodiment is directed to an apparatus. The apparatus includes receiving means for receiving a request for a power level schedule for a network device. The request includes a time period for the power level schedule. The apparatus also includes retrieving means for retrieving cron job strings associated with the network device, parsing means for parsing the cron job strings to determine transitions from one power level to another and times for the transitions of the power level of the network device, and building means for building a visual grid depicting the power level schedule for the network device during said time period based on the determined transitions.

BRIEF DESCRIPTION OF THE DRAWINGS

For proper understanding of the invention, reference should be made to the accompanying drawings, wherein:

FIG. 2 illustrates an example Cron command in accordance with one embodiment;

FIG. 3 illustrates a visual power level grid according to one embodiment; and

DETAILED DESCRIPTION

Embodiments of the present invention include a method, apparatus, system, and/or computer program for monitoring energy consumption in a network and producing a display grid that provides a visual depiction of network device power consumption at any given time. In one example, Cron commands are used to set the power level of network devices in a network on a given power consumption schedule. Embodiments of the invention evaluate these Cron commands and build a visual grid that displays the power level of the network devices at any given hour within a time period. As a result, network administrators and/or users can request a visual grid showing the power consumption of any network device on their network, and are able to browse the grid to determine if there are any trouble spots or whether modifications to power levels should be made. Example implementations of the invention will be discussed in more detail below.

Figure 1:
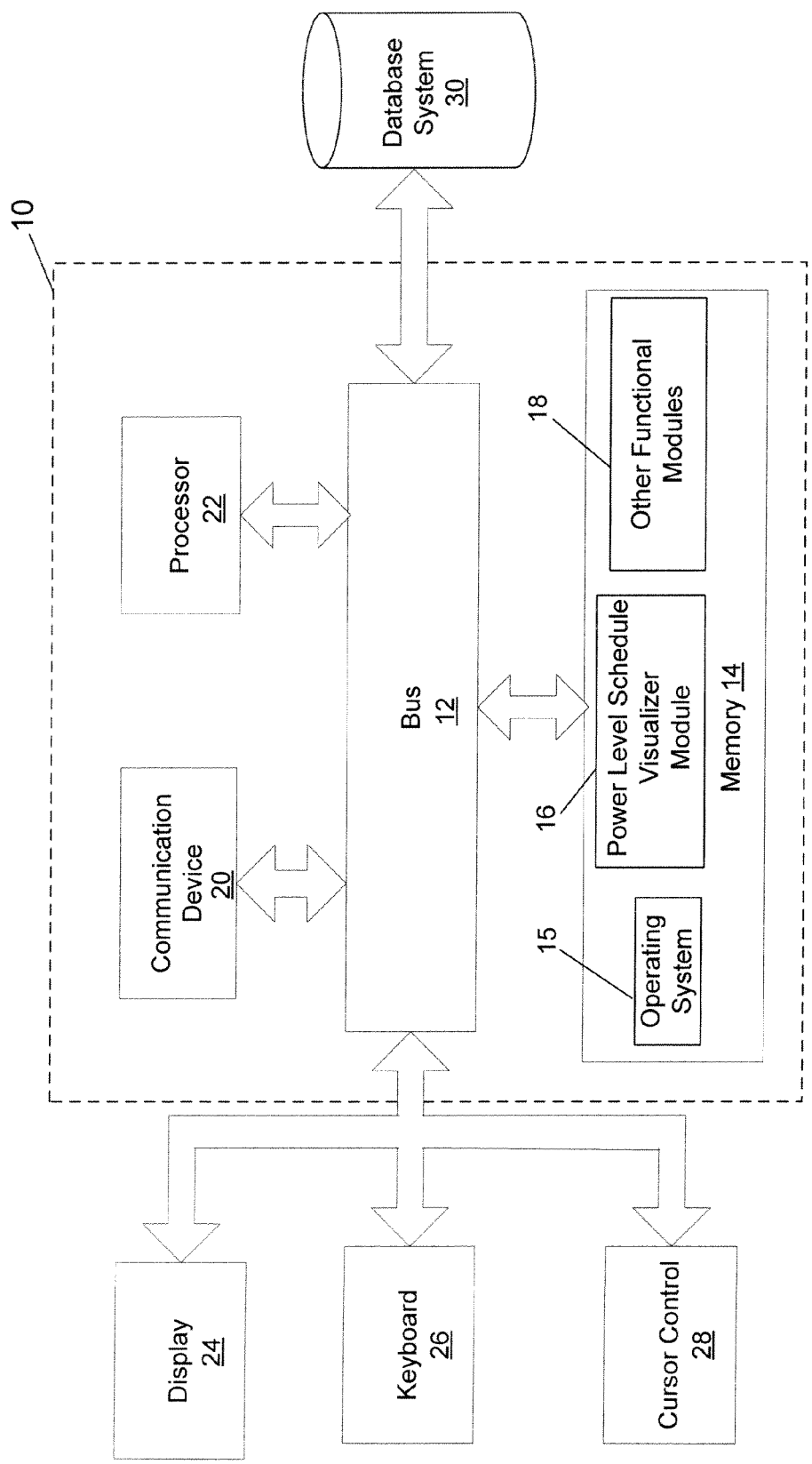
FIG. 1 illustrates a block diagram of an exemplary apparatus according to one embodiment of the invention.

FIG. 1 illustrates a block diagram of a system 10 that may implement one embodiment of the invention. System 10 includes a bus 12 or other communications mechanism for communicating information between components of system 10. System 10 also includes a processor 22, coupled to bus 12, for processing information and executing instructions or operations. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of machine or computer readable media. System 10 further includes a communication device 20, such as a network interface card or other communications interface, to provide access to a network. As a result, a user may interface with system 10 directly or remotely through a network or any other method.

Computer readable media may be any available media that can be accessed by processor 22 and includes both volatile and nonvolatile media, removable and non-removable media, and communication media. Communication media may include computer readable instructions, data structures, program modules or other data or transport mechanism and includes any information delivery media.

Processor 22 is further coupled via bus 12 to a display 24, such as a Liquid Crystal Display ("LCD"), for displaying information to a user, such as information regarding devices on the network and their power usage or consumption. A keyboard 26 and a cursor control device 28, such as a computer mouse, are further coupled to bus 12 to enable a user to interface with system 10. Processor 22 and memory 14 may also be coupled via bus 12 to a database system 30 and, thus, may be able to access and retrieve information stored in database system 30. Although only a single database is illustrated in FIG. 1, any number of databases may be used in accordance with certain embodiments.

In one embodiment, memory 14 stores software modules that provide functionality when executed by processor 22. The modules may include an operating system 15 that provides operating system functionality for system 10. The memory may also store a power level schedule visualizer module 16, which provides a tool for monitoring and depicting a power level schedule for a network device, as will be discussed in more detail below. System 10 may also include one or more other functional modules 18 to provide additional functionality.

In certain embodiments, processor 22, power level schedule visualizer module 16, and other functional modules 18 may be implemented as separate physical and logical units or may be implemented in a single physical and logical unit. Furthermore, in some embodiments, processor 22, power level schedule visualizer module 16, and other functional modules 18 may be implemented in hardware, or as any suitable combination of hardware and software.

Database system 30 may include a database server and any type of database, such as a relational or flat file database. In one example, database system 30 may store Cron commands or Cron job strings, and/or any other data required by the power level schedule visualizer module 16, or data associated with system 10 and its associated modules and components.

As would be understood by a person of ordinary skill in the art, Cron is shorthand for chronograph and refers to a time-based job scheduler in certain computer operating systems. Cron enables users to schedule jobs to run automatically at a certain time and/or date. Cron is often used to perform system maintenance or administration, but can be used to schedule almost any task within the operating system. According to one example, Cron commands in the form of Cron job strings are used to schedule changes to power levels of a network device within the network. Cron job strings generally refer to a list of date/time strings that define when devices in a network should be powered on or off, or transitioned to a different power level. In other words, Cron job strings are a set of commands used to configure different ports or interfaces within a network to utilize more or less power at different points of the day or night. For instance, a Cron job string may be utilized to completely power down certain network devices after midnight when network traffic is reduced, and to power up those devices in the morning when network traffic increases again.

FIG. 2 illustrates an example Cron job string for modifying power levels of a network device. More specifically, FIG. 2 is the text output of the configurations of a network device enabled according to embodiments of the invention. The line "interface FastEthernet1/0/2" identifies which of the ports on the device the subsequent listing of configurations is regarding. The group of configurations is commonly referred to as a "policy". The "switchport mode access" line is not important for this description. Each configuration line that starts with "energywise" in the subsequent set of lines each uniquely identifies a power level transition Cron job. Each line is formatted in the following way. The term "energywise" identifies this line as a Cisco® EnergyWise configuration line. The next term is a combination of the keyword "level" and a numeric value in the range 0 through 10. This number identifies which EnergyWise level the interface will be set to, based on the criteria that follows in the rest of the configuration line. The keyword "recurrence" identifies this entry to be recurrent in nature and will be executed by the device according to the importance and Cron job settings that follow. The "importance" keyword is followed by a number 0 through 100 and identifies the important of the port in the domain of EnergyWise ports. In this example, 100 is the highest importance. The "at" keyword signifies the beginning of the Cron job string description. The Cron job string is in the format "minute hour day_of_month month day_of_week" where each of these items is defined in the following format:

minute—The range is from 0 to 59. Uses * for the wildcard.
    hour—The range is from 0 to 23. Uses * for the wildcard.
    day_of_month—The range is from 1 to 31. Uses * for the wildcard.
    month—The range is from 1 (January) to 12 (December). Uses * for the wildcard.
    day_of_week—The range is from 0 to 7 (0 and 7 both represent Sunday). Uses * for the wildcard.

The * wildcard character indicates that the transition will occur for all possible values on the variable. These lines identify the total policy for the given EnergyWise port and the device with cause the power transitions to happen at the time or series of times identified by each configuration line. In this example, the first configuration line in FIG. 2 would be interpreted in the following manner: the port will be transitioned to a power level of 10 at the highest importance at 8:00 a.m. on each day of the month, every month when the day of the week is Monday through Friday inclusively.

Referring again to FIG. 1, according to one embodiment of the invention, system 10 gathers policy event descriptions, such as Cron job strings, via a simple network management protocol (SNMP) from a device that has those details. According to certain embodiments, the device from which the policy event descriptions are gathered may be a network switch or router. SNMP refers to a user datagram protocol (UDP) based network protocol that can be used in network management systems to monitor network-attached devices for conditions that warrant administrative action. System 10 may then store the retrieved Cron job strings in database system 30 for later access.

System 10 may include a receiver (not shown) configured to receive a request for a power level schedule for a network device over a certain time period or date range. Pursuant to the request, processor 22 then retrieves the stored Cron job strings associated with that network device from the database system 30. The Cron job strings are provided to power level schedule visualizer module 16 which parses the Cron job strings to determine when transitions from one power level to another are occurring for the network device over the given date range. In one embodiment, power level schedule visualizer module 16 produces a list of status transitions for the device based on the date range. Power level schedule visualizer module 16 can then convert the list of transitions into a visual depiction of the power level schedule for the network device. In particular, power level schedule visualizer module 16 builds a visual grid that shows the hour-by-hour power level status for the network device during the requested time period, based on the determined transitions.

FIG. 3 illustrates an example of a visual grid depicting the power level of a network device over a one week time period, according to an embodiment of the invention. According to this example, the grid represents a query for power levels of a device between 0:00 a.m. on Oct. 4, 2009 and 11:59:59 p.m. on Oct. 10, 2009. The visual grid includes a cell for each hour of each day during the week. Each cell may be assigned a number or color representing the power level of the network device during the hour represented by the cell. For instance, as shown in FIG. 3, the power level may be represented by a number between 0 and 10, where 0 indicates that the device is shut down and 10 indicates that the device is miming at full power.

In order to build the visual grid illustrated in FIG. 3, power level schedule visualizer module 16 will analyze the retrieved Cron job strings to determine when a first power level transition occurs. In the example grid of FIG. 3, there is a transition at 0:00 a.m. on Oct. 4, 2009 to go to power level 0. As a result, power level schedule visualizer module 16 will produce a display of 0 in the first cell in the top left corner of the grid. Additionally, power level schedule visualizer module 16 will produce a display of 0 for all subsequent cells until another power level transition is found within the Cron job strings. In this example, the next valid transition is at 0:00 a.m. on Oct. 5, 2009 to go to power level 4. Therefore, power level 4 is displayed beginning at 0:00 a.m. on Oct. 5, 2009 until the next valid power level transition. In this manner, power level schedule visualizer module 16 analyzes all retrieved Cron job strings looking for all power level transitions in order to produce the visual grid. In one embodiment, if the requested date range does not begin with a power level transition, then power level schedule visualizer module 16 may look back prior to the requested date range in order to find the most recent transition to appropriately determine the start point of the visual grid.

Figure 4:
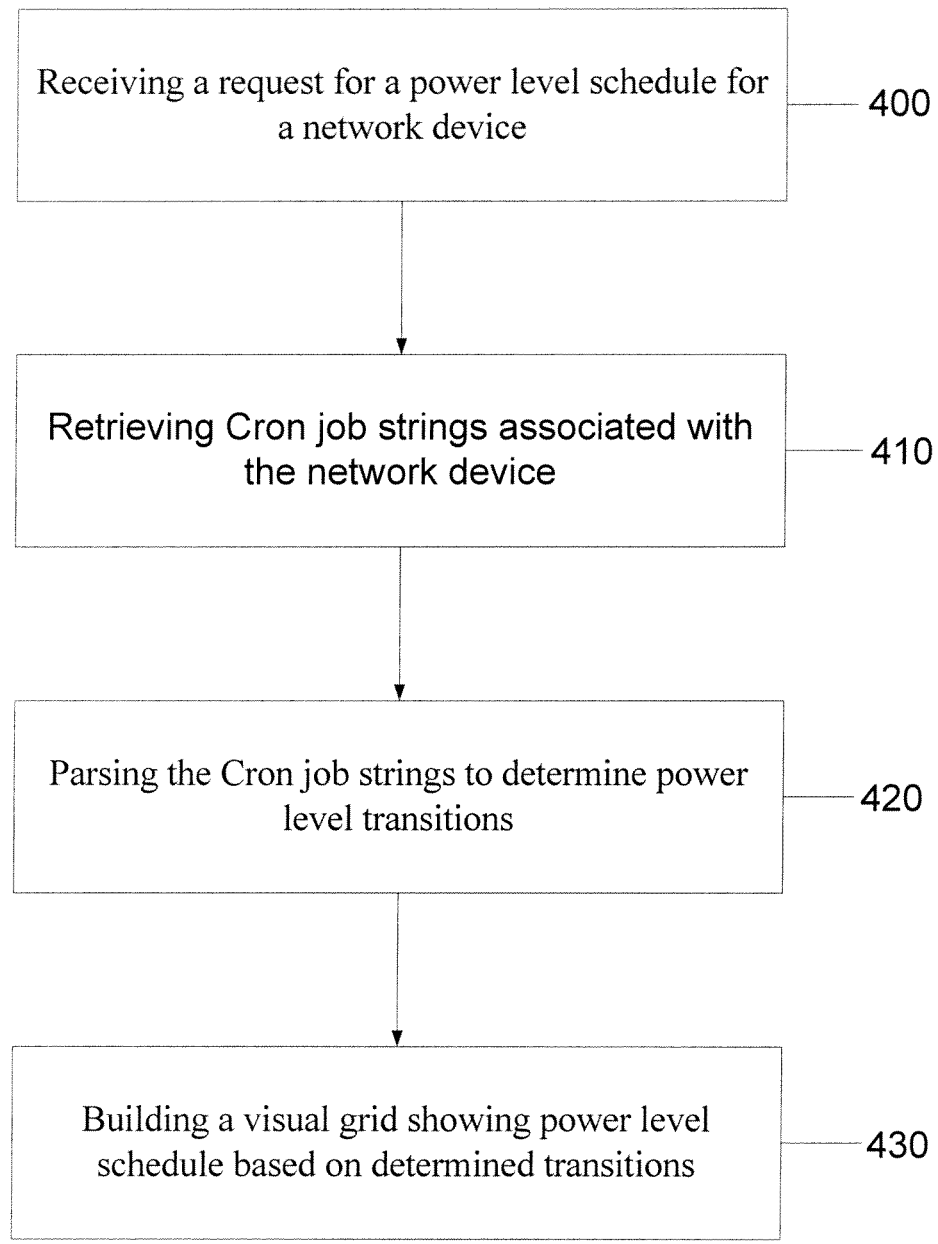
FIG. 4 illustrates a method in accordance with one embodiment.

Embodiments of the invention also include a method for monitoring, analyzing and visualizing a power level schedule of a network device, as illustrated in FIG. 4. The method may include receiving 400 a request for a power level schedule for a network device. The request may include a time period or date range over which the power level schedule should be produced. The method may also include retrieving 410 Cron job strings associated with the network device, and parsing 420 the Cron job strings to determine transitions from one power level to another and times for the transitions of the power level of the network device. In one embodiment, the Cron job strings may be retrieved from a database. The method further includes building 430 a visual grid that depicts the power level schedule for the network device during each hour of the time period, based on the determined transitions.

In view of the above, embodiments of the invention provide a method, system, apparatus, and/or computer program for monitoring energy consumption in a network and producing a display grid that provides a visual depiction of network device power consumption at any given time. In one embodiment, the visual grid is produced by interpreting commands used to control or schedule certain events on the network. Thus, embodiments of the invention produce a power utilization schedule for a given device, port or interface on the network in an easy to read grid format.

The computer readable medium mentioned above may be at least partially embodied by a transmission line, a compact disk, digital-video disk, a magnetic tape, a Bernoulli drive, a magnetic disk, holographic disk or tape, a punch card, flash memory, magnetoresistive memory, integrated circuits, or other digital processing apparatus memory device.

The described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
receiving a request for a power level schedule for a network device, the request comprising a time period for the power level schedule;
retrieving cron job strings associated with the network device;
parsing the cron job strings to determine transitions from one power level to another and times for the transitions of the power level of the network device; and
building a visual grid depicting the power level schedule for the network device during said time period based on the determined transitions,
wherein the visual grid comprises hour-by-hour power level status for the network device over said time period.

2. The method of claim 1, wherein the retrieving comprises retrieving the cron job strings via simple network management protocol (SNMP).

3. The method of claim 1, wherein the retrieving comprises retrieving the cron job strings from a database.

4. The method of claim 1, wherein the visual grid comprises a cell for each hour of each day within said time period.

5. The method of claim 4, wherein the cell comprises an indication of power level of the network device at the hour and day represented by the cell.

6. An apparatus, comprising:
a receiver configured to receive a request for a power level schedule for a network device, the request comprising a time period for the power level schedule;
a processor configured to control the apparatus to
retrieve cron job strings associated with the network device;
parse the cron job strings to determine transitions from one power level to another and times for the transitions of the power level of the network device; and build a visual grid depicting the power level schedule for the network device during said time period based on the determined transitions, wherein the visual grid comprises hour-by-hour power level status for the network device over said time period.

7. The apparatus of claim 6, wherein the retrieving comprises retrieving the cron job strings via simple network management protocol (SNMP).

8. The apparatus of claim 6, wherein the retrieving comprises retrieving the cron job strings from a database.

9. The apparatus of claim 6, wherein the visual grid comprises a cell for each hour of each day within said time period.

10. The apparatus of claim 9, wherein the cell comprises an indication of power level of the network device at the hour and day represented by the cell.

11. A computer program embodied on a non-transitory computer readable medium, the computer program configured to control a processor to perform operations, comprising:

receiving a request for a power level schedule for a network device, the request comprising a time period for the power level schedule;

retrieving cron job strings associated with the network device;

parsing the cron job strings to determine transitions from one power level to another and times for the transitions of the power level of the network device; and building a visual grid depicting the power level schedule for the network device during said time period based on the determined transitions, wherein the visual grid comprises hour-by-hour power level status for the network device over said time period.

12. The computer program of claim 11, wherein the retrieving comprises retrieving the cron job strings via simple network management protocol (SNMP).

13. The computer program of claim 11, wherein the retrieving comprises retrieving the cron job strings from a database.

14. The computer program of claim 11, wherein the visual grid comprises a cell for each hour of each day within said time period.

15. The computer program of claim 14, wherein the cell comprises an indication of power level of the network device at the hour and day represented by the cell.

16. An apparatus, comprising:

receiving means for receiving a request for a power level schedule for a network device, the request comprising a time period for the power level schedule;

retrieving means for retrieving cron job strings associated with the network device;

parsing means for parsing the cron job strings to determine transitions from one power level to another and times for the transitions of the power level of the network device; and building means for building a visual grid depicting the power level schedule for the network device during said time period based on the determined transitions, wherein the visual grid comprises hour-by-hour power level status for the network device over said time period.

* * * * *